United States Patent [19]

Akazawa et al.

[11] Patent Number: 4,810,755

[45] Date of Patent: Mar. 7, 1989

[54] ADHESIVE RESIN COMPOSITION, LAMINATED MATERIAL USING IT AND RESIN COMPOSITION CONTAINING IT

[75] Inventors: Toshiyuki Akazawa, Kurashiki; Takuji Okaya, Nagaokakyo; Takashi Inoue, Yokohama; Toshitaka Kobayashi, Funabashi, all of Japan

[73] Assignees: Kuraray Co., Ltd., Okayama; Nippon Petrochemical Co., Ltd., Tokyo, both of Japan

[21] Appl. No.: 13,827

[22] Filed: Feb. 12, 1987

[30] Foreign Application Priority Data

Feb. 25, 1986 [JP] Japan .................................. 61-41038
Feb. 25, 1986 [JP] Japan .................................. 61-41039

[51] Int. Cl.$^4$ ...................... C08L 33/02; C08L 33/08; C08L 33/10
[52] U.S. Cl. ...................................... 525/285; 525/301; 525/327.8
[58] Field of Search .................... 525/327.8, 57, 309, 525/285, 301, 247, 250; 428/412

[56] References Cited

U.S. PATENT DOCUMENTS

| | | | |
|---|---|---|---|
| 3,998,990 | 12/1976 | Iwami et al. | 428/463 |
| 4,005,247 | 1/1977 | Graham | 525/327.8 |
| 4,451,599 | 5/1984 | Oderzynski et al. | 525/57 |
| 4,590,131 | 5/1986 | Yazaki et al. | 525/59 |
| 4,595,532 | 3/1986 | Schmukler et al. | 525/57 |
| 4,657,972 | 4/1987 | Giles, Jr. et al. | 525/57 |

*Primary Examiner*—Allan M. Lieberman

[57] ABSTRACT

An adhesive resin composition useful for bonding a resin having gas barrier properties and a hydrophobic thermoplastic resin which comprises an ethylene-acrylate or methacrylate copolymer grafted with an ethylenic unsaturated carboxylic acid or its acid anhydride; and 0.02 to 0.6 equivalent to the ethylenic unsaturated carboxylic acid or its acid anhydride of a periodic table group Ia or IIa metal hydroxide, or said metal hydroxide and an ethylene-acrylate or methacrylate copolymer. A laminated material of a resin having gas barrier properties and a hydrophobic thermoplastic resin laminated with the adhesive resin composition and a resin composition comprising the adhesive resin composition, a resin having gas barrier properties and a hydrophobic thermoplastic resin are also disclosed.

4 Claims, No Drawings

ADHESIVE RESIN COMPOSITION, LAMINATED MATERIAL USING IT AND RESIN COMPOSITION CONTAINING IT

FIELD OF THE INVENTION

The present invention relates to an adhesive resin composition, a laminated material obtained by laminating a resin having gas barrier properties, particularly, a saponified ethylene-vinyl acetate copolymer resin (hereinafter referred to as EVOH) and a hydrophobic thermoplastic resin with the adhesive resin composition, and a resin composition containing the adhesive resin composition.

BACKGROUND OF THE INVENTION

Recently, the food packaging art has undergone remarkable technical innovation. For example, it is well known that hydrophobic thermoplastic resins such as saturated polyesters and the like are being put to practical use in food packaging to improve hygienic qualities and provide beautiful appearance as well as to save weight for cutting the cost of transport. However, such saturated polyester resins have low gas barrier properties against oxygen, carbon dioxide and the like and, therefore, are not suitable for long-term storage. Accordingly, glass bottles and metallic cans are predominantly used, resulting in environmental problems when used cans are discarded, increase in cost for recovering used bottles and the like. In view of this, it is desired to develop other suitable materials for packaging.

EVOH containing 20-55 mole % of ethylene component has excellent properties suitable for food containers and packaging materials such as melt molding characteristics, high transparency and excellent gas barrier properties. However, other properties thereof, for example, stiffness and resistance to moisture are defective and insufficient.

Hydrophobic thermoplastic resin, particularly, a saturated polyester resin mainly composed of polyethylene terephthalate is excellent in molding characteristics, in the balance between impact resistance and stiffness, in hygienic qualities and the like. However, as described above, its gas barrier properties against oxygen, carbon dioxide and the like thereof are insufficient, and its use for food containers and packaging materials is limited.

Therefore, in order to impact both good gas barrier properties of EVOH and excellent mechanical properties of a hydrophobic thermoplastic resin such as a saturated polyester resin to food containers and packaging materials, lamination of both resins may be considered. However, both resins have little affinity for each other and it is not possible to obtain a laminated material of both resins by simple thermal adhesion.

Japanese Patent Kokai No. 55-71556 discloses good adhesion between a polymer composed of ethylene component-acrylate or vinyl acetate component-ethylenic unsaturated carboxylic acid or its acid anhydride component, and a saturated polyester resin. This publication shows that a modified ethylene-carboxyl group containing monomer copolymer, wherein an ethylenic unsaturated carboxylic acid or its acid anhydride is chemically bonded to a copolymer composed of ethylene and a carboxyl group containing monomer, such as ethylene-vinyl acetate copolymer or ethylene-acrylate copolymer, has good adhesion to a saturated polyester resin. The utility thereof is also disclosed in the publication.

Japanese Patent Kokai No. 54-101883 discloses that a thermoplastic resin and EVOH can be laminated by using as an intermediate layer a modified ethylene-carboxyl group containing monomer copolymer, wherein an ethylenic unsaturated carboxylic acid or its acid anhydride is chemically bonded to a copolymer composed of ethylene and a carboxyl group containing monomer. In addition, in Japanese Patent Kokai No. 54-110282, a laminated structure containing EVOH is obtained by using as an adhesive layer a metal-combining modified copolymer which is produced by chemically bonding an ethylenic unsaturated carboxylic acid or its acid anhydride to a copolymer composed of ethylene and a carboxyl group containing monomer, and reacting with a metallic oxide or carbonate.

However, when a copolymer composed of ethylene component-acrylate component or lower fatty acid vinyl ester component-ethylenic unsaturated carboxylic acid or its anhydride component, or a resin obtained by reaction of such a copolymer with a metallic oxide or a carbonate is used as an adhesive layer in a combination of EVOH and a hydrophobic thermoplastic resin such as a saturated polyester resin mainly composed of polyethylene terephthalate, the resulting material has less commercial value even though adhesion is effected to some extent. For example, the laminated material obtained has inferior appearance due to formation of streaks, hard spots, wave patterns, etc., the main cause of which is considered to be nonuniformity in thickness of the layer of resin having gas barrier properties and formation of a gelled material.

Furtheer, Japanese Patent Kokoku No. 39-6810 discloses a process for preparing an ionic copolymer wherein one or more water soluble ionic metallic compounds are reacted with a copolymer obtained from one or more α-olefins and one or more α, β-ethylene type unsaturated carboxylic acids which have one or two carboxyl groups. In this publication, it is taught that a preferred base copolymer is that obtained by directly copolymerizing ethylene with a monocarboxylic acid monomer in the presence of or in the absence of an additional copolymerizable monoethylene type unsaturated monomer. This publication also teaches that, when 10% or more of the acid group of this base copolymer is neutralized with a metallic ion such as Na+ and the like, both desired melt-flow characteristics as well as desired solid state physical properties such as rubber elasticity, flexibility, therml stability, tenacity, wear resistance and the like can be imparted to the resulting material. This is advantageous to the material obtained in this publication. On the other hand, although it is also taught that the base copolymer can be obtained by graft-polymeizing α-olefin and an acid monomer with a polyolefin base, it is explained that this process is suitable for using a polyolefin obtained from an olefin having a molecular weight larger than that of ethylene, for example, propylene, butene-1, etc., and there is no disclosure that ethylene-acrylate or vinyl acetate copolymer can be used as a polyolefin. Further, the invention disclosed in this publication relates to improvement of physical properties such as those described above in a resin having a melt index (MI) of 0.1-100 g/10 min., and it is disclosed therein that the resin can be used as an adhesive or for a laminated material, when the MI thereof is 100 g/10 min. or more.

However, an ionic copolymer obtained by reacting a copolymer composed of one or more α-olefins and one or more α,β-ethylene type unsaturated carboxylic acids which have one or two carboxyl groups, with one or more water soluble ionic metallic compounds does not exhibit adhesion at all regardless of the presence of acrylate or vinyl acetate component. Further, when the MI is 100 g/10 min. or more, there are drawbacks such as difficulty in molding due to too large an MI. Therefore, the adhesive resin is not practically useful.

In Japanese Patent Kokai No. 54-87783, it is disclosed that, when a polyolefin obtained by modification of a part or all of the polyolefin with at least one monomer selected from unsaturated carboxylic acids and derivatives thereof is laminated with EVOH, a polyamide resin or a polyester resin, interlaminar adhesion can be improved by incorporating at least one metallic compound selected from the group consisting of metallic salts of higher fatty acids, metallic oxides, metallic hydroxides, metallic carbonates, metallic sulfates and metallic silicates into at least one layer. The polyolefin disclosed in this patent publication is a homopolymer of α-olefin such as ethylene, propylene, 1-butene, 1-pentene, 3-methyl-1-butene, 1-hexene, 4-methyl-1-pentene and the like, or a copolymer of at least one monomer and other α-olefins. It is disclosed in the publication that the advantage of the invention is extraordinary inter alia in medium or high density polyethylene and polypropylene. Ethylene-vinyl acetate copolymer is also disclosed.

However, in Japanese Patent Kokai No. 54-87783, there is no disclosure relating to an ethylene-acrylate copolymer and an ethylene-methacrylate copolymer.

OBJECTS OF THE INVENTION

Under these circumstances, the present inventors have intensively studied the relation between various properties of an adhesive resin, and coextrusion adhesion and molding characteristics on the basis of consideration of requisite properties for an adhesive resin in industrial coextrusion to obtain a laminated material which has good coextrusion adhesion and good appearance, even in industrial coextrusion. As the result, it has been found that a specific modified resin composition is suitable for an adhesive resin composition, and a laminated material having excellent properties can be obtained by using this adhesive resin composition. Further, it has been found that an intimate blend composition of a resin having gas barrier properties and a hydrophobic thermoplastic resin can be obtained by using the adhesive resin composition.

One object of the present invention is to provide an adhesive resin composition which shows good interlaminar bonding properties and excellent molding characteristics, and is particularly useful for lamination of a resin having gas barrier properties and a hydrophobic thermoplastic resin.

Another object of the present invention is to provide a laminated material which has both the excellenr gas barrier properties of a resin having gas barrier properties such as EVOH and the excellent mechanical properties of a hydrophobic thermoplastic resin such as a saturated polyester resin, a polycarbonate, etc., and which can be produced on an industrial scale.

Another object of the present invention is to provide a laminated material useful for food containers and packaging materials.

Still another object of the present invention is to provide a resin composition which is an intimate blend of EVOH and a hydrophobic thermoplastic resin.

These objects as well as other objects and advantages of the present invention will become apparent to those skilled in the art from the following description.

SUMMARY OF THE INVENTION

According to one aspect of the present invention, there is provided an adhesive resin composition which comprises:

an ethylene-acrylate or methacrylate copolymer grafted with an ethylenic unsaturated carboxylic acid or the carboxylic acid anhydride thereof; and either 0.02 to 0.6 equivalent to the ethylenic unsaturated carboxylic acid or it acid anhydride of a periodic table group Ia or IIa metal hydroxide; or said metal hydroxide and an ethylene-acrylate or methacrylate copolymer.

In another aspect, the present invention provides a laminated material of a resin having gas barrier properties and a hydrophobic thermoplastic resin laminated with the adhesive resin composition.

In the present invention, both requisite adhesion and molding characteristics can be imparted to a coextruding adhesive resin by incorporating a periodic table group Ia or IIa metal hydroxide into a modified ethylene-acrylate or methacrylate copolymer having a specific composition in a specific amount. Although the mechanism is not clear, it is considered that these excellent properties may result from an interfacial chemical interaction, i.e. a chemical reaction and the like at the interface between a layer of the adhesive resin composition and a hydrophobic thermoplastic resin layer and/or between a layer of the adhesive resin composition and a layer of a resin having gas barrier properties in a coextrusion molding step, particularly, on melting of resins due to incorporation of a periodic table group Ia and IIa metal hydroxide in a specific range.

This is particularly surprising because it is unpredictable from known techniques that as a modified ethylene-carboxyl group containing monomer copolymer wherein an ethylenic unsaturated carboxylic acid or its acid anhydride is chemically bonded to a carboxyl group containing monomer such as an acrylate, vinyl acetate, a methacrylate and the like; or a metal combining modified copolymer wherein a metallic oxide or carbonate is reacted with the above modified ethylene-carboxyl group containing monomer copolymer: would show adhesion to EVOH, a saturated polyester resin and the like and, further, that a solid state can be improved by a metallic ion.

In a further aspect of the present invention, there is provided an intimate blend composition of a resin having gas barrier properties and a hydrophobic thermoplastic resin which contains the adhesive resin composition.

DETAILED EXPLANATION OF THE INVENTION

The adhesive resin composition of the first aspect of the present invention comprises:

an ethylene-acrylate or methacrylate copolymer grafted with an ethylenic unsaturated carboxylic acid or its acid anhydride; and 0.02 to 0.6 equivalent to the ethylenic unsaturated carboxylic acid or its acid anhydride of a periodic table group Ia or IIa metal hydroxide. The adhesive resin composition of the first aspect of the present invention also includes a blend of this metal hydroxide containing composition obtained and an additional ethylene-acrylate or methacrylate copolymer.

As the ethylene-acrylate copolymer, there can be used, for example, ethylene-methyl acrylate copolymer, ethylene-ethyl acrylate copolymer, ethylene-butyl acrylate copolymer, ethylene-n-hexyl acrylate copolymer, ethylene-2-methyl-hexyl acrylate copolymer and the like. Among these, ethylene-ethyl acrylate copolymer is preferred. The content of the acrylate component is preferably 5–45% by weight. Particularly, in view of adhesion and molding characteristics, 10–30% by weight is more preferred. The ethylene-acrylate copolymer can be prepared by any known method and, usually, that having an MI of in the range of 0.01–50 g/10 min. and a density of 0.92–0.97 g/cm$^3$ is used.

As the ethylene-methacrylate copolymer, there can be used, for example, ethylene-methyl methacrylate copolymer, ethylene ethyl methacrylate copolymer, ethylene-butyl methacrylate copolymer, ethylene-n-hexyl methacrylate copolymer, ethylene-2-methyl-hexyl methacrylate copolymer and the like. The content of the methacrylate component is preferably 5–45% by weight. Particularly, in view of adhesion and molding characteristics, 10–35% by weight is more preferred. The ethylene-methacrylate copolymer can be prepared by any known method and, usually, that having an MI of in the range of 0.01–50 g/10 min. and a density of 0.92–0.97 g/cm$^3$ is used.

Examples of the ethylenic unsaturated carboxylic acid or its acid anhydride used for graft polymerization include maleic acid, acrylic acid, itaconic acid, crotonic acid, maleic anhydride, itaconic anhydride and the like. Among these, maleic anhydride is preferred. The amount thereof is to be grafted with the ethylene-acrylate or methacrylate copolymer is 0.01–6% by weight. In view of adhesion and molding characteristics, 0.1–5% by weight is preferred.

The method for grafting is not limited to a specific one and includes, for example, a heat reaction of the ethylene-acrylate copolymer and the ethylenic unsaturated carboxylic acid or its acid anhydride in the presence of an organic peroxide compound such as dibenzoyl peroxide, dibutyl peroxide, dicumyl perioxide, t-butyl perbenzoate, t-butyl hydroperoxide, cumene hydroperoxide and the like to form a chemical bond between them. The reaction can be carried out in the presence, or in the absence of a solvent such as benzene, toluene, xylene, chlorobenzene, t-butylbenzene, cumene and the like at 100°–240° C. So that homogeneous product can be obtained, preferably, the reaction is carried out in the presence of a solvent such as toluene, xylene and the like at 110°–190° C.

Examples of the periodic table group Ia or IIa metal hydroxide include lithium hydroxides, sodium hydroxide, potassium hydroxide, calcium hydroxide, magnesium hydroxide and the like. Among these, sodium hydroxide is preferred. The amount of the periodic group Ia and IIa metal hydroxide to be added varies depending upon the particular hydroxide used. Howeve, the amount of 0.02–0.6 equivalent, preferably, 0.03–0.3 equivalent of the ethylenic unsaturated carboxylic acid or its acid anhydride which is grafted. When the amount is smaller than 0.02 equivalent, it is difficult to obtain a desired industrially useful molding mateial due to formation of a wave pattern extending through the entire material, or formation of unevenness. On the other hand, when the amount is larger than 0.6 equivalent, a resulting adhesive resin composition becomes unsuitable for use as a molding material because the composition is colored and/or the fluidity thereof becomes inferior.

The adhesive resin composition of the present invention comprising the ethylene-acrylate or methacrylate copolymer grafted with the ethylenic unsaturated carboxylic acid or its acid anhydride and 0.02–0.6 equivalent of the ethylenic unsaturated carboxylic acid or its acid anhydride of the periodic table group Ia or IIa metal hydroxide is preferably used as such but, occasionally, this metal containing composition can be used by further blending with an ethylene-acrylate or methacrylate copolymer. As described above, this blend is also included in the adherent resin composition of the present invention.

In the case of further blending with copolymer, the amount of the metal containing composition (i.e., the combination of grafted copolymer and metal hydroxide) present in the resulting blend varies depending upon a particular composition but said metal containing composition is blended so that said metal containing composition is present in the resulting blend of grafted copolymer, metal hydroxide and ethylene-acrylate or methacrylate copolymer in an amount of 1–60% by weight based on the total weight of said resulting blend. In view of production cost, molding characteristics and the like, 2–40% by weight is preferred.

In the adhesive resin composition of the present invention, other additives which are conventional for a thermoplastic resin can be included. Examples of such additives include antioxidants, ultraviolet absorbers, plasticizers, antistatic agents, lubricants, colorants, fillers and the like. These additives can be blended is so far as the excellent properties of the composition are maintained. Specific examples of the additives are as follows.

Antioxidants: 2,5-di-t-butylhydroquinone, 2,6-t-butylhydroquinone, 2,6-di-t-butyl-p-cresol, 4,4'-thiobis-(6-t-butylphenol), 2,2'-methylene-bis(4-methyl-6-t-butyl-phenol), tetrakis-[methylene-3-(3',5'-di-t-butyl-4'-hydroxyphenyl)propionate]methane, octadecyl-3-(3',5'-di-t-butyl-4'-hydroxyphenyl)propionate, 4,4'-thiobis-(6-t-butylphenol), etc.

Ultraviolet absorbers: ethyl-2-cyano-3,3-diphenylacrylate, 2-(2'-hydroxy-5'-methylphenyl)-5-chlorobenzotriazole, 2-(2'-hydroxy-3'-t-butyl-5'-methylphenyl)-5-chlorobenzotriazole, 2-hydroxy-4-methoxybenzophenone, 2,2'-dihydroxy-4-methoxybenzophenone, 2-hydroxy-4-octoxybenzophenone, etc.

Plasticizers: dimethyl phthalate, diethyl phthalate, dioctyl phthalate, wax, liquid paraffin, phosphate esters, etc..

Antistatic agents: pentaerythritol monostearate, sorbitan monopalmitate, sulfated oleic acid, polyethylene oxide, Carbowax, etc.

Lubricants: ethylene-bis-stearamide, butyl stearate, etc.

Colorants: carbon black, phthalocyanine, quinacridone, indoline, azo-pigments, titanium oxide, red oxide, etc.

Fillers: glass fiber, asbestos, mica, ballastnite, aluminum silicate, etc.

The adhesive resin composition of the present invention can be produced by admixing desired ingredients according to conventional methods. A known device or apparatus such as a ribbon blender, a high-speed mixer, a kneader, a mixing roll, Banbury mixer or an extruder can be used.

Although the MI (JIS K-6760, 190° C., 2,160 g) of the adhesive resin composition thus obtained may vary according to the MI's of the hydrophobic thermoplastic resin and the resin having gas barrier properties to be used in molding, it is preferably 0.2–50 g/10 min., more preferably, 0.5–30 g/10 min.

As a second aspect of the present invention, the present invention provides a laminated material of a resin having a gas barrier properties and a hydrophobic thermoplastic resin laminated by the adhesive resin composition of the present invention.

Examples of the resin having gas barrier properties of the laminated material of the present invention include EVOH, polyamide resins such as nylon 6, nylon 6-6 and nylon 6-12 and the like. Particularly, in view of molding characteristics and gas barrier properties, it is preferred to use EVOH having an ethylene component content of 20–55 mole % and a saponification degree of not less than 90%. Furthermore, a modified resin obtained by treating the above EVOH with a boron compound such as boric acid or borax, or by copolymerizing a copolymerizable third component together with ethylene and vinyl acetate and then saponifying the resultant product, also has melt characteristics and, in so far as gas barrier properties are maintained, it can be also used as the resin having gas barrier properties.

As the hydrophobic thermoplastic resin, there can be used any resin having heat melt moldability. Preferred examples of the resin include saturated polyester, polycarbonate, polyvinyl chloride, polystyrene, shock-resistant polystyrene, polyethylene, polypropylene, ethylene-vinyl acetate copolymer, ethylene-acrylate copolymer and the like. Among these, a saturated polyester and a polycarbonate are more preferred. When EVOH is used as the resin having gas barrier properties, it is possible to use a polyamide resin such as nylon 6, nylon 6-6 or nylon 6-12 as the hydrophobic thermoplastic resin.

The saturated polyester is a condensation polymer of a dicarboxylic acid and a diol component. As the dicarboxylic acid, there can be used, for example, terephthalic acid, isophthalic acid, naphthalene dicarboxylic acid and the like. These dicarboxylic acids can be used alone or in combination thereof. Further, there can be also used a small amount of adipic acid, sebacic acid and the like in combination with the above dicarboxylic acids. Examples of the diol component include ethylene glycol, butylene glycol, hexylene glycol, cyclohexane dimethanol and the like. They can be used alone or in combination thereof. Further, as a minor component, there can be used a small amount of diethylene glycol, polytetramethylene glycol, pentaerythritol, bisphenol A and the like in combination with the above diol components. Particularly, it is preferred to use as the dicarboxylic acid component terephthalic acid in an amount not less than 70 mole % because properties of the molded product obtained such as transparency, mechanical properties and the like are more improved. Although the polymerization degree of the saturated polyester is not limited to a specific one, it is preferred to use a saturated polyester having $[\eta]$ (dl/g) of 0.3–2.0 determined in a mixed solvent of phenol/tetrachloroethane (50/50) at 30° C.

As the polycarbonate, an aromatic polycarbonate is preferred. The aromatic polycarbonate is a polymer or copolymer obtained by reaction of a dihydroxyaryl compound with phosgene, diphenyl carbonate or the like. Examples of the dihydroxyaryl compound include bisphenol A, bis(4-hydroxyphenyl)methane, 1,1-bis(4-hydroxyphenyl)ethane, 2,2-bis(4-hydroxyphenyl)butane, bis(4-hydroxyphenyl)phenylmethane, 2,2-bis(4-hydroxyphenyl)cyclopentane, 1,1-bis(4-hydroxyphenyl)cyclohexane, 4,4'-hydroxydiphenyl ether, 4,4'-dihydroxyphenyl sulfide, 4,4'-dihydroxydiphenyl sulfoxide, 4,4'-dihydroxydiphenyl sulfone and the like. They can be used alone or in combination thereof. Optionally, hydroquinone, resorcinol and the like can be appropriately polymerized in addition to the above dihydroxyaryl compounds.

Among the polycarbonates, a representative one is a polymer obtained by reaction of bisphenol A with phosgene, and having $[\eta]$ (dl/g) of 0.1–1 determined in methylene chloride at 20° C.

The laminated material of the present invention is that obtained by laminating a resin having gas barrier properties and the hydrophobic thermoplastic resin with a adhesive resin composition of the present invention. The construction of the laminated materials is, for example, a three layered structure of three resins such as B/A/C, a three or five layered symmetrical or asymmetrical structure of three resins such as B/A/C/A/B, C/A/B/A/C. B/A/C/A/B' or C/A/B/A/C' (wherein B and B' are the resins having gas barrier properties; A is the adhesive resin composition; and C and C' are the hydrophobic thermoplastic resins) or other multi-layered structures of B, A and C wherein at least one of B and C is layered to itself such as B/B/A/C, B/A/C/C/ or B/B/A/C/C.

The laminated material of the present invention can be produced by known methods for example, lamination within a die, thermal adhesion with a laminating press outside of a die, and the like. Lamination within a die (coextrusion) is preferred. Extrusion molding with a T-die or a ring die is more preferred. Furthermore, direct blow molding and injection blow molding are also applicable.

The laminated material thus obtained has both good gas barrier properties and excellent mechanical properties and, therefore, is useful for food containers (e.g., cups and bottles) and packaging material. Furthermore, subjecting the laminated material to uniaxial or biaxial orientation, deep draw, blow molding and the like further enhances its utility. In addition, the laminated material of the present invention can be further laminated with one or more other sheet materials such as synthetic resin film, metal foil, paper and the like.

As a third aspect, the present invention also provides an intimate blend composition comprising the adhesive resin composition of the present invention, the above EVOH and the above hydrophobic thermoplastic resin.

That is, when the laminated material of the present invention or a trimmed part thereof which contains the above EVOH as the resin having gas barrier properties is recovered for re-use, a blend composition of the adhesive resin composition comprising the present invention (A), EVOH (B) and the above hydrophobic thermoplastic resin (C) is obtained.

It has been known that a blend composition of EVOH (B) and the hydrophobic thermoplastic resin (C) has excellent characteristics. However, in general, such a composition has inferior homogeneity and inferior molding characteristics. Therefore, when it is molded into a film, sheet, bottle and the like by extrusion molding, an ununiform phase separated foreign matter, or a gel from an insolubilized resin, particularly, EVOH is liable to form. It is known that, when the operation time is longer, such foreign matter increases and, as a result, appearance of the resulting molded product is impaired. Accordingly, although a blend composition of EVOH and the hydrophobic thermoplastic resin has excellent characteristics, in practice, extrusion molding is not applicable or, even if extrusion molding is applicable, the operation time should be very short.

Thus, it is very difficult to re-use recovered laminated material obtained by coextrusion of EVOH and hydrophobic thermoplastic resin.

Nevertheless, when molding is carried out by using a recovered material comprising the above ingredients (A), (B) and (C), or a freshly prepared blend composition comprising the ingredients (A), (B) and (C) according to the present invention, the inferior homogeneity and inferior molding characteristics of a mixture of EVOH and the hydrophobic thermoplastic resin remarkably improve, and a coextruded product having beautiful appearance or a molded product having good gas barrier properties and excellent mechanical properties can be obtained.

By the way, although it is preferred to use the above adhesive resin composition as the ingredient (A) in the blend composition of the present invention, the periodic table group Ia or IIa metal hydroxide used in the adhesive resin composition may be replaced by a salt or oxide of the metal such as, for example, sodoum carbonate, lithium carbonate, magnesium carbonate, sodium acetate and the like. Further, the ethylene-acrylate or methacrylate copolymer used in the adhesive resin composition may be replaced by an ethylene-vinyl acetate copolymer so as to that have vinyl acetate component content of 5 to 50% by weight, preferably,, in view of homogeneity and molding characteristics, 10-40% by weight. These compositions are also included in the scope of the present invention.

Thus, the ingredient (A) used in this aspect of the present invention comprises:

an ethylene-aceylate, methacrylate or vinyl acetate copolymer grafted with an ethylenic unsaturated carboxylic acid or its acid anhydride; and 0.02 to 0.6 equivalent of the ethylenic unsaturated carboxylic acid or its acid anhydride of a periodic table group Ia or IIa metal hydroxide, salt or oxide. The ingredient (A) also includes a blend of the metal compound containing modified resin and an ethylene-acrylate, methacrylate or vinyl acetate copolymer.

The amount of each ingredient, (A), (B) or (C) in the blend composition of the present invention is not limited to a specific range and it can be optionally chosen according to a particular use of the composition. However, from a practical point of view, it is of importance that the composition ratio of the hydrophobic thermoplastic resin (C) to EVOH having an ethylene component content of 20-55 mole % and a saponification degree of not less than 90% (B) should be such that the amount of either resin is larger than that of the other to impart characteristic properties such as either excellent mechanical properties or good gas barrier properties to the composition.

Examples of a composition containing a larger amount of the hydrophobic thermoplastic resin include that having a weight ratio of the hydrophobic thermoplastic resin (C): EVOH (B) of 60:40–99.9:0.1, particularly, 70:30–99.7:0.3. On the other hand, examples of a composition containing a larger amount of the resin (B) include that having a weight ratio of the hydrophobic thermoplastic resin (C): EVOH (B) of 1:99–40:60, particularly, 5:95–30:70.

The amount of the ingredient (A) in the blend composition of the present invention is chosen so that homogeneity of the composition is improved while maintaining desired properties of the composition such as mechanical properties, transparency and gas barrier properties. In many cases, the amount of the ingredient (A) is 0.1–50 parts by weight, particularly, 1 to 30 parts by weight per 100 parts by weight of the sum of the weights of the hydrophobic thermoplastic resin (C) and EVOH (B) ((C)+(B)). When the amount of the ingredient (A) exceeds 50 parts by weight, the properties such as mechanical properties, transparency and gas barrier properties of the composition mainly composed of the hydrophobic thermoplastic resin (C) and EVOH (B) of the present invention are liable to be impaired. On the other hand, when the amount of the ingredient (A) is lower than 0.1 part by weight, sometimes, homogeneity becomes insufficient depending upon the particular combination of the hydrophobic thermoplastic resin (C) and EVOH (B).

There is no limitation on the method for blending the three ingredients (A), (B) and (C) to obtain the intimate blend composition of the present invention. For example, the three ingredients can be dryblended, or the ingredient (A) can be previously admixed with a part or all of either the hydrophobic thermoplastic resin (C) or EVOH (B).

Although the mechanism by which the ingredient (A) remarkably improves homogeneity and molding characteristics of EVOH (B) and the hydrophobic thermoplastic resin (C) is not fully clear, it is presumed that the ingredient (A) effectively acts in a complicatedly combined state of rheological effect, chemical action and the like in a melt system of EVOH (B) and the hydrophobic thermoplastic resin (C).

By the way, in the composition comprising the ingredients (A), (B) and (C), when an ethylene-acrylate copolymer is used as the hydrophobic thermoplastic resin ingredient (C), it is necessary to use a copolymer suitable for a molding material and having an acrylate content lower than that of the ethylene-acrylate copolymer in the ingredient (A). Likewise, when an ethylene-vinyl acetate copolymer is used as the hydrophobic thermoplastic resin ingredient (C), it is necessary to use a copolymer suitable for a molding material and having a vinyl acetate content lower than that of the ethylene-vinyl acetate copolymer in the ingredient (A).

The resin composition of the present invention comprising the ingredients (A), (B) and (C) can be also used as a layer of a multi-ply structure. Particularly, when the multi-ply structure is M/E/M, M/D/E/, M/D/E/D/M, P/D/E/D/M, P/E/P/M, P/M/D/E/D/M/P, P/M/D/E/D/P and the like (wherein P is a hydrophobic thermoplastic resin layer; E is a layer of EVOH having an ethylene component content of 20–55 mole % and a saponification degree of not less than 90%; D is an adhesive resin layer; and E is the blend composition of the present invention comprising the ingredients (A), (B) and (C), a beautiful molded product having good homogeneity and excellent molding characteristics can be obtained. In this case, it is effective to use the above adhesive resin composition (A) of the present invention as the adhesive resin layer D. In such a multi-ply molded product, the composition of the present invention comprising (A), (B) and (C)

may be not only laminated material scrap, but also composition freshly prepared by blending the respective ingredients (A), (B) and (C). A method for producing a multi-ply product is not limited to any specific one. For example, a so-called coextrusion molding which is carried out by using extruders the number of which corresponds to the number of the kinds of resins to be used, coextruding the resins molten in the extruders in such a laminar state that a flow of a molten resin is deposited upon a flow of another molten resin and molding the resins into a multi-ply product can be employed. Other multi-ply molding methods such as extrusion coating, dry lamination and the like can be also employed. Furthermore, subjecting a molded product of the blend composition of the present invention or a multi-ply molded product containing the blend composition to uniaxial or biaxial orientation, deep draw, blow molding and the like, can further enhance the utility of the product. In addition, the laminated product thus obtained can be further laminated with one or more other sheet materials such as synthetic resin film, metal foil, paper and the like.

A molded product obtained by using the blend composition of the present invention has various excellent properties such as high strength characteristics and good gas barrier properties due to homogeneity of said blend composition, and is very valuable from an industrial point of view.

The following examples and comparative examples further illustrate the present invention but are not to be construed to limit the scope thereof. In the examples and comparative examples, all "parts" and "%'s" are by weight unless otherwise stated.

EXAMPLES 1-4

An ethylene-ethyl acrylate copolymer (215 parts) having an ethyl acrylate component content of 25%, an MI (190° C, 2,160 g) of 6.3 g/10 min., a density of 0.936 g/cm$^3$ and a melting point of 70° C., and maleic anhydride (1.8 parts) were dissolved in purified toluene (648 parts) and the solution was maintained at 180° C. To the solution was continuously added a purified toluene solution (180 parts) of maleic anhydride (5 parts) with stirring over 2 hours. Concurrently, a purified toluene solution (100 parts) of cumene hydroperoxide (1.0 part) was also continuously added over 2 hours. After completion of addition, the reaction was continued for an additional 30 min. After cooling, the reaction mixture was poured into a large amount of methyl alcohol to precipitate a polymer. The polymer obtained was re-precipitated by using purified toluene as a solvent and methyl alcohol as a non-solvent. The resulting polymer contained 1.5% of maleic anhydride and had an MI of 4.3 g/10 min.

An aqueous solution containing a predetermined amount of sodium hydroxide was homogeneously admixed with the polymer thus obtained. After partial drying, the mixture was melted, kneaded and pelletized by using a vent extruder under reduced pressure with discharging volatiles to obtain an adhesive resin composition comprising a modified copolymer.

A predetermined amount of the adhesive resin composition thus obtained was dryblended with the above ethylene-ethyl acrylate copolymer and then melted, kneaded and pelletized by using an extruder to obtain an adhesive resin blend.

By using EVOH obtained by saponification of 99.9% of the vinyl acetate segment of an ethylene-vinyl acetate copolymer having a vinyl acetate component content of 67 mole % which had [η] of 1.11 (in a mixed solution of phenol/water (85/15), 30° C., dl/g) as a resin having gas barrier properties, and by using a saturated polyester obtained by polycondensation of terephthalic acid as the dicarboxylic acid component thereof and ethylene glycol as the diol component thereof which had [η] of 0.67 (in a mixed solution of phenol/tetrachloroethane (50/50), 30° C., dl/g) as a hydrophobic thermoplastic resin, laminate materials were produced as follows.

A feed block type coextruding apparatus for five layers of three kinds of resins was used. This apparatus had an extruder I having an inner diameter of 120 mmφ, an extruder II having an inner diameter of 60 mmφ and an extruder III having an inner diameter of 90 mmφ. In the extruders I and II, each molten material was extruded in two separated layers. The two layers from the extruder II were layered on the both surfaces of a layer of a molten resin extruded from the extruder III, respectively, and successively the two layers from the extruder I were layered on the both surfaces of the resulting layered material. The hydrophobic thermoplastic layer (C), the adhesive resin composition (A) and the resin having gas barrier properties (B) were fed to the extruders I, II and III, respectively, and a laminated sheet having 5 layers of three kinds of resins, C/A/B/A/C (400 μ/50 μ/50 μ/50 μ/400 μ) was produced by coextrusion at a die temperature of 260° C. and at a take-off speed of 4 m/min. The sheet was deep drawn by using an infrared heating-vacuum forming machine and a frame at a draw ratio of 1:1 to obtain a cup. Appearance and peel strength of the cup thus obtained were evaluated. The results are shown in Table 1 hereinafter.

As seen from Table 1, the molded products of Examples 1 and 2 wherein NaOH was added in the amount of 0.05 equivalent of grafted maleic anhydride had good appearance and sufficient adhesion between the layers. The molded products of Examples 3 and 4 wherein NaOH was added in the amount of 0.1 equivalent of grafted maleic anhydride has very good appearance and sufficient adhesion between the layers. By the way, even if the content of the adhesive resin composition in the blend was as low as 20%, peeling strength was almost the same as that obtained using the adhesive resin composition alone.

COMPARATIVE EXAMPLES 1-4

The same procedure as described in Examples 1-4 was repeated except that the amount of NaOH to be added was changed. The results of evaluation of appearance and peel strength are also shown in Table 1.

As seen from Table 1, the molded products of Comparative Examples 1 and 2 wherein no NaOH was added had uneven surfaces and therefore less commercial value. When NaOH was added in an amount of 1.0 equivalent, the modified copolymer was brown in color (Comparative Example 3). Further, it was impossible to intimately blend the modified copolymer and the ethylene-ethyl acrylate copolymer, and not only extreme brownish graininess but also overall browning was observed (Comparative Example 4). Because these resins had less commercial value, coextrusion molding was not carried out.

TABLE 1

| Ex. No. | Amount of NaOH added (eq.) | Content of adhesion resin composition in blend (%) | Molded product Appearance | T-peel* strength (kg/cm) |
| --- | --- | --- | --- | --- |
| Ex. 1 | 0.05 | 100 | good | 0.6 |
| Ex. 2 | 0.05 | 20 | good | 0.5 |
| Ex. 3 | 0.1 | 100 | very good | 0.6 |
| Ex. 4 | 0.1 | 20 | very good | 0.5 |
| Comp. Ex. 1 | 0 | 100 | remarkable unevenness | 0.1-0.5 |
| Comp. Ex. 2 | 0 | 20 | remarkable unevenness | 0.1-0.5 |
| Comp. Ex. 3 | 1.0 | 100 | Molding was not carried out because of remarkable coloring. | |
| Comp. Ex. 4 | 1.0 | 20 | Molding was not carried out because of remarkable coloring. | |

*Peel strength was determined toward the peripheral direction at the central body part of the cup (T-peel, 20 mm/min., 20° C., 65% RH).

COMPARATIVE EXAMPLE 5

Coextrusion molding was carried out according to the same procedure as described in Example 1 except that only the ethylene-ethyl acrylate copolymer was used as the resin of the layer (A) without addition of the adhesive modified polymer composition. Although the resulting molded product showed good appearance, adhesion between the layers was inferior and the layers were readily peeled apart. Thus, the product had less commercial value.

EXAMPLES 5-6

An adhesive resin composition was obtained according to the same procedure as described in Example 1 except that an ethylene-ethyl acrylate copolymer having an ethyl acrylate component content of 30%, an MI (190° C., 2,160 g) of 11.2 g10 min., a density of 0.938 g/cm$^3$ and a melting point of 80° C. was used and the amounts of maleic anhydride and cumene hydroperoxide were changed and except that NaOH was added in the amount of 0.08 equivalent.

The resulting adhesive composition was dryblended with an ethylene-ethyl acrylate copolymer having an ethyl acrylate component content of 30%, an MI (190° C., 2,160 g) of 11.2 g10 min., a density of 0.94 g/cm$^3$ and a melting point of 80° C. in a weight ratio of 10:90 to obtain the resin for the layer (A).

By using EVOH obtained by saponification of 99.5% of the vinyl acetate segment of an ethylene-vinyl acetate copolymer having a vinyl acetate component content of 56 mole % which had [η] of 0.96 (in a mixed solution of phenol/water (85/15), 30° C., dl/g) as the resin having gas barrier properties (B), and by using a polycarbonate (manufactured and sold by Mitsubishi Chemical Industries Limited under the trade name of "NOVAREX 7030A") as the hydrophobic thermoplastic resin (C), laminated materials were produced as followed.

A flat die type coextruding apparatus for three layers of three kinds of resins was employed. The apparatus had an extruder I having an inner diameter of 60 mmφ, an extruder II having an inner diameter of 40 mmφ and an extruder III having an inner diameter of 90 mmφ. The molten materials from the respective extruders were spread with respective manifolds in a die and then joined together in the die to form a multi-ply structure. The hydrophobic thermoplastic resin (C), the adhesive resin composition (A) and the resin having gas barrier properties (B) were fed into the extruders I, II and III, respectively and coextrusion was carried out at take-off speed of 4 m/min. to obtain a laminated sheet having three layers of C/A/B (200 μ/50 μ/50 μ). Appearance and peel strength of the laminated sheet were evaluated. The results are shown in Table 2 hereinafter.

As seen from Table 2, the laminated sheets of Examples 5 and 6 had good appearance and sufficient adhesion between layers.

COMPARATIVE EXAMPLES 6-9

The same procedure as described in Examples 5 and 6 was repeated except that the amount of NaOH was changed. The results of evaluation of appearance and peel strength are also shown in Table 2.

As seen from Table 2, the products of Comparative Examples 6 and 7 wherein no NaOH was added had uneven surfaces and less commercial value. When NaOH was added in an amount of 1.0 equivalent, the modified copolymer was brown in color and had extremely inferior fluidity. Therefore, coextrusion molding was not carried out (Comparative Example 8). Further, it is impossible to intimately blend the modified copolymer wherein NaOH was added in the amount of 1.0 equivalent and the ethylene-ethyl acrylate copolymer, and the sheet showed extreme brownish graininess and had less commercial value.

TABLE 2

| Ex. No. | Amount of NaOH added (eq.) | Content of adhesion resin composition in blend (%) | Molded product Appearance | T-peel* strength (kg/cm) |
| --- | --- | --- | --- | --- |
| Ex. 5 | 0.08 | 100 | good | 0.7 |
| Ex. 6 | 0.08 | 20 | good | 0.9 |
| Comp. Ex. 6 | 0 | 100 | remarkable unevenness | 0.2-0.6 |
| Comp. Ex. 7 | 0 | 20 | remarkable unevenness | 0.3-0.6 |
| Comp. Ex. 8 | 1.0 | 100 | Molding was not carried out because of remarkable coloring. | |
| Comp. Ex. 9 | 1.0 | 20 | remarkable colored graininess | 0.2-0.4 |

*Peel strength was determined toward the axial direction at the central part of the sheet (T-peel, 20 mm/min., 20° C., 65% RH).

EXAMPLE 7

An ethylene-ethyl acrylate copolymer (215 parts) having an ethyl acrylate component content of 25%, an MI (190° C., 2,160 g) of 6.3 g/10 min. and a melting point of 70° C., and maleic anhydride (1.8 parts) were dissolved in purified toluene (648 parts) and the solution was maintained at 180° C. To the solution was continuously added a purified toluene solution (180 parts) of maleic anhydride (5 parts) with stirring over 2 hours. Concurrently, a purified toluene solution (100 parts) of cumene hydroperoxide (1.2 part) was also continuously added over 2 hours. After completion of addition, the reaction was continued for additional 30 min. After cooling, the reaction mixture was poured into a large amount of methyl alcohol to precipitate a polymer. The polymer obtained was reprecipitated by using purified toluene as a solvent and methyl alcohol as a nonsolvent. The resulting polymer contained 1.5% of maleic anhydride and had an MI of 4.3 g10 min.

An aqueous solution containing a predetermined amount of sodium hydroxide was homogeneously admixed with the polymer thus obtained. After partial drying, the mixture was melted, kneaded and pelletized by using a vent extruder under reduced pressure with discharging volatiles to obtain a modified copolymer. Then, the modified copolymer (20 parts) thus obtained was dryblended with ethylene-ethyl acrylate copolymer (80 parts) and then melted, kneaded and pelletized to obtain a mixture of the copolymers.

Polyethylene terephthalate ($[\eta]=0.68$) (75 parts), EVOH (ethylene component: 33 mole %; saponification degree: 99.9%; MI (190° C., 2,160 g): 1.5 g/10 min.) (15 parts) and a mixture of the copolymers obtained above (10 parts) were dryblended. The mixture was fed to an extruder having a full flighted screw having a diameter of 40 mm, L/D of 24 and a compression ratio of 3.8, and a film was formed by using a flat die having a 550 mm width. The operation conditions were as follows. Extrusion temperature: 200°–280° C.; Die temperature: 265° C.; Thickness of the film rolled: 100μ; and Continuous operation time: 8 hours. The film obtained showed good homogeneity and no phase separated foreign matter due to inferior mixing or inferior stability was observed.

A test piece of 90 mm square of the film obtained was oriented both lengthwise and laterally by using a biaxial orientation test apparatus (manufactured by Toyo Seiki Seisaku-sho K. K., Japan) at a draw ratio toward each direction of 3 and a draw speed of 5 m/min. after heating at 85° C. for 1 min. Orientation was uniformly effected and, when the oriented film obtained was fixed on a wooden frame and subjected to heat treatment in a hot air drier at 160° C., a film having high strength and good gas barrier properties was obtained.

COMPARATIVE EXAMPLE 10

A modified copolymer was obtained according to the same procedure as described in Example 7 except that NaOH was not added. As in Example 7, the modified copolymer obtained was admixed with the ethylene-ethyl acrylate copolymer and, further, admixed with polyethylene terephthalate (PET) and EVOH. The resulting mixture was extruded to form a film. After 30 min. from initiation of the operation, an ununiform phase separated foreign matter which was not observed in the film of Example 7 began to appear in the film and increased with the elapse of time. The film obtained had inferior appearance.

EXAMPLES 8–11 AND COMPARATIVE EXAMPLES 11–14

A modified copolymer was obtained according to the same procedure as described in Example 7 except that the amount of NaOH was changed. A predetermined amount of the modified copolymer obtained was dryblended with a predetermined amount of ethylene-ethyl acrylate copolymer to obtain the ingredient (A) and, further, it was dryblended with Pet and EVOH as described in Example 7 in amounts as shown in Table 3 hereinafter. As in Example 7, the mixture was extruded to form a film. Surface appearance of the film obtained was evaluated. The results are shown in Table 3.

As seen from Table 3, the products of Examples 8 and 9 wherein 0.05 equivalent to grafted maleic anhydride of NaOH was added had good appearance. Further, the products of Examples 10 and 11 wherein 0.1 equivalent of NaOH was added had very good appearance. On the other hand, the products of Comparative Examples 11 and 12 wherein no NaOH was added were uneven on the surfaces and had less commercial value. When 0.9 equivalent of NaOH was added, the resulting modified copolymer was brown in color and had inferior fluidity. Therefore, film formation was not carried out (Comparative Example 13). The film obtained without using the modified copolymer had extremely inferior appearance (Comparative Example 14).

When only ethylene-ethyl acrylate copolymer was used as the ingredient (A) without addition of any modified copolymer, and film formation was carried out by extrusion according to the same procedure as described in Example 7, an ununiform phase separated matter which was not observed in the film of Example 7 began to appear just after initiation of the operation. The film obtained has extremely inferior appearance.

TABLE 3

| Ex. No. | Formulation of resins (parts) Ingredients | | | | Appearance of film |
|---|---|---|---|---|---|
| | (A) Modified copolymer [NaOH (eq)] | EEA* | (B) PET | (C) EVOH** | |
| Ex. 8 | 2 [0.05] | 8 | 70 | 20 | good |
| Ex. 9 | 5 [0.05] | 5 | 70 | 20 | good |
| Ex. 10 | 1 [0.1] | 4 | 90 | 5 | very good |
| Ex. 11 | 2 [0.1] | 0 | 90 | 8 | very good |
| Comp. Ex. 11 | 2 [0] | 8 | 70 | 20 | remarkable unevenness |
| Comp. Ex. 12 | 1 [0] | 4 | 90 | 5 | remarkable unevenness |
| Comp. Ex. 13 | — [0.9] | — | — | — | no film formation due to extreme coloring |
| Comp. Ex. 14 | 0 [—] | 10 | 70 | 20 | remarkable unevenness |

*EEA: ethylene-ethyl acrylate copolymer having an ethyl acrylate component content of 25%, an MI (190° C., 2,160 g) of 6.3 g/10 min. and melting point of 70° C.
**EVOH: having an ethylene component content of 33 mole %, a saponification degree of 99.9% and an MI (190° C., 2,160 g) of 1.5 g/10 min.

EXAMPLES 12–15 AND COMPARATIVE EXAMPLES 15–18

A modified copolymer having a maleic anhydride content of 2.9% was obtained according to the same procedure as described in Example 7 except that an ethylene-vinyl acetate copolymer having a vinyl acetate component content of 20% and an MI (190° C., 2,160 g) of 2.1 g10 min. was used, the amounts of maleic anhydride and cumene hydroperoxide were changed and potassium carbonate was used instead of NaOH. A predetermined amount of the modified copolymer obtained was dryblended with a predetermined amount of ethylene-vinyl acetate copolymer having a vinyl acetate content of 25% and an MI of 5.5 g10 min. to obtain the ingredient (A).

EVOH having $[\eta]$ of 0.96 (in a mixed solvent of phenol/water (85/15), 30° C., dl/g) obtained by saponification of 99.5% of the vinyl acetate segment of an ethylene-vinyl acetate copolymer having a vinyl acetate content of 56 mole % was used as the ingredient (B). A polycarbonate (manufactured and sold by Mitsubishi Chemical Industries Limited, Japan under the trade name of NOVAREX 7030) was used as the ingredient (C).

A flat die type coextrusion apparatus for three layers of three kinds of resins was employed. The apparatus had an extruder I equipped with a single screw having an inner diameter of 60 mmφ and an L/D of 25, an extruder II equipped with a single screw having an inner diameter of 40 mmφ and an L/D of 25 and a twin screw extruder III equipped with screws intermeshing in the same direction and each having an inner diameter of 90 mmφ and an L/D of 22. Molten materials from the respective extruders were spread in respective manifolds in a die and laminated in the die. A blend composition (M) of the above resins (A) (B) and (C) dryblended in a predetermined ratio, an ethylene-vinyl acetate adhesive resin (D) (manufactured by Mitsui Petrochemical Industries, Ltd. in Japan under the trade name of "Admer VF 600") and EVOH (B) were fed to the extruders III, II and I, respectively and coextrusion was carried out to obtain a sheet having three layers, B/D/M (50 μ/50 μ/450 μ). Surface appearance of the sheet obtained was evaluated. The results are shown in Table 4.

As seen from Table 4, the products of Examples 12–15 wherein 0.14 equivalent of potassium carbonate to grafted maleic anhydride was added had good appearance. The products of Comparative Examples 15 and 16 wherein 0.01 equivalent of potassium carbonate was added had remarkable unevenness and less commercial value. When potassium carbonate was added in the amount of 1.0 equivalent, the resulting modified resin was brown in color and had extremely inferior fluidity. Therefore, coextrusion was not carried out (Comparative Example 17). The sheet of Comparative Example 18 wherein only ethylene-vinyl acetate copolymer was used as the ingredient (A) instead of the modified copolymer had remarkable graininess and less commercial value.

TABLE 4

| Ex. No. | (A) Modified copolymer [K₂CO₃ (eq)] | (B) EVA* | (C) PC | EVOH** | Appearance of sheet |
|---|---|---|---|---|---|
| Ex. 12 | 2 [0.14] | 8 | 70 | 20 | good |
| Ex. 13 | 5 [0.14] | 5 | 70 | 20 | good |
| Ex. 14 | 1 [0.14] | 4 | 90 | 5 | good |
| Ex. 15 | 2 [0.14] | 0 | 90 | 8 | good |
| Comp. Ex. 15 | 2 [0.005] | 8 | 70 | 20 | remarkable unevenness |
| Comp. Ex. 16 | 1 [0.005] | 4 | 90 | 5 | remarkable unevenness |
| Comp. Ex. 17 | — [1.0] | — | — | — | no film formation due to extreme coloring |
| Comp. Ex. 18 | 0 [—] | 10 | 70 | 20 | remarkable unevenness |

*EVA: ethylene-vinyl acetate copolymer having a vinyl acetate component content of 20%, an MI (190° C., 2,160 g) of 2.1 g/10 min.
**EVOH: having an ethylene component content of 44 mole %, a saponification degree of 99.5% and an MI (190° C., 2,160 g) of 5.4 g/10 min.

EXAMPLE 16

The cup obtained in Example 1 [(A): (B): (C)=88 parts: 8 parts: 5 parts] was recovered and used in coextrusion as in Example 7 to obtain a film. The surface of the film obtained had a good appearance.

COMPARATIVE EXAMPLE 19-20

The same polymer as used in Examples 1–4 having a maleic acid component content of 1.5% and an MI of 4.3 g/10 min was admixed with 0.6 equivalent to maleic anhydride of magnesium oxide and the mixture was subjected to heat reaction at 200° C. in an extruder having an inner diameter of 50 mmφ to pelletize.

Coextrusion and drawing were carried out according to the same procedure as described in Examples 1–4 except that the pellets thus obtained were used to obtain a cup.

As seen from Table 5, the cup obtained had remarkable unevenness and less commercial value.

TABLE 5

| Ex. No. | Amount of MgO (eq.) | Content of modified copolymer (%) | Product Appearance | T-peel* strength (kg/cm) |
|---|---|---|---|---|
| Comp. Ex. 19 | 0.6 | 100 | remarkable unevenness | 0.4 |
| Comp. Ex. 20 | 0.6 | 20 | remarkable unevenness | 0.4 |

*T-peel strength was determined axially at the central part of the product. T-peel, 20 mm/min., 20° C., 65% RH

What is claimed is:

1. An adhesive composition which comprises (a) metal containing composition consisting of (i) an ethylene-acrylate or methacrylate copolymer containing from 5 to 45% by weight acrylate or methacrylate component content, said copolymer being grafted with 0.01 to 6% by weight of an ethylenic unsaturated carboxylic acid or its acid anhydride; and (ii) 0.02 to 0.6 equivalent of the ethylenic unsaturated carboxylic acid or its acid anhydride of a periodic table Group Ia or IIa metal hydroxide; or (b) a blend of said metal containing composition (a) with ethylene-acrylate or methacrylate copolymer wherein said metal containing composition (a) constitutes 1–60% by weight of said blend.

2. An adhesive resin composition according to claim 1, wherein the acrylate or methacrylate is ethyl acrylate or ethyl methacrylate.

3. An adhesive resin composition according to claim 1, wherein the ethylenic unsaturated carboxylic acid or its acid anhydride is maleic acid or maleic anhydride.

4. An adhesive resin composition according to claim 1, wherein the periodic table group Ia and IIa metal hydroxide is sodium hydroxide.

* * * * *

UNITED STATES PATENT AND TRADEMARK OFFICE
CERTIFICATE OF CORRECTION

PATENT NO. : 4,810,755
DATED : March 7, 1989
INVENTOR(S) : Toshiyuki Akazawa et al It is certified that error appears in the above-identified patent and that said Letters Patent is hereby corrected as shown below:

On the cover page, the assignee designated "Nippon Petrochemical Co., Ltd." should be --Nippon Petrochemicals Co., Ltd.--.

Claim 3, (column 18, line 64), delete "maleic acid or".

Signed and Sealed this

Eighteenth Day of July, 1989

Attest:

DONALD J. QUIGG

Attesting Officer

Commissioner of Patents and Trademarks